(12) United States Patent
De Gaillard et al.

(10) Patent No.: US 10,619,493 B2
(45) Date of Patent: Apr. 14, 2020

(54) BLADE EQUIPPED WITH PLATFORMS COMPRISING A RETAINING LEG

(71) Applicant: Safran Aircraft Engines, Paris (FR)

(72) Inventors: Thomas Alain De Gaillard, Moissy-cramayel (FR); Caroline Jacqueline Denise Berdou, Moissy-cramayel (FR); Alexandre Bernard Marie Boisson, Moissy-cramayel (FR); Matthieu Arnaud Gimat, Moissy-cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 52 days.

(21) Appl. No.: 15/569,134

(22) PCT Filed: Apr. 26, 2016

(86) PCT No.: PCT/FR2016/050982
§ 371 (c)(1),
(2) Date: Oct. 25, 2017

(87) PCT Pub. No.: WO2016/174346
PCT Pub. Date: Nov. 3, 2016

(65) Prior Publication Data
US 2018/0100400 A1    Apr. 12, 2018

(30) Foreign Application Priority Data

Apr. 29, 2015 (FR) ..................................... 15 53851

(51) Int. Cl.
*F01D 5/22* (2006.01)
*B29B 11/16* (2006.01)
(Continued)

(52) U.S. Cl.
CPC .............. *F01D 5/225* (2013.01); *B29B 11/16* (2013.01); *F01D 5/26* (2013.01); *F01D 5/282* (2013.01);
(Continued)

(58) Field of Classification Search
CPC .......... F01D 5/225; F01D 5/282; F01D 9/041; F05D 2240/80; F05D 2240/81; F05D 2300/6034; B29B 11/16; B29B 11/14
See application file for complete search history.

(56) References Cited

U.S. PATENT DOCUMENTS 2,656,146 A * 10/1953 Sollinger ............... B21D 53/78
29/509
3,294,364 A * 12/1966 Stanley ................. F01D 5/3007
416/193 A
(Continued)

FOREIGN PATENT DOCUMENTS

WO    WO 2013/079860 A1    6/2013
WO    WO 2013/104852 A2    7/2013
WO    WO 2014/076408 A1    5/2014

OTHER PUBLICATIONS

International Search Report and English translation dated Sep. 22, 2016, in International Application No. PCT/FR2016/050982 (6 pages).

*Primary Examiner* — Richard A Edgar
*Assistant Examiner* — Maxime M Adjagbe
(74) *Attorney, Agent, or Firm* — Bookoff McAndrews, PLLC

(57) ABSTRACT

A preform for a turbine engine blade, the preform being obtained by three-dimensional weaving and comprising a first longitudinal segment (31) suitable for forming at least a portion of a blade root, a second longitudinal segment (32) extending the first longitudinal segment (31) upwards, and suitable for forming at least a portion of a stilt portion, a (Continued)

third longitudinal segment (33) extending the second longitudinal segment (32) upwards, and suitable for forming an airfoil portion, a first transverse segment (34) extending transversely from the junction between the second and third longitudinal segments (32, 33), and suitable for forming a first platform, and a first oblique segment (36) extending from the junction between the first and second longitudinal segments (31, 32) to the first transverse segment (34), and suitable for forming a retaining leg (26) for the first platform.

11 Claims, 4 Drawing Sheets

(51) Int. Cl.
| | | |
|---|---|---|
| | *F01D 5/28* | (2006.01) |
| | *F01D 5/26* | (2006.01) |
| | *F01D 5/30* | (2006.01) |
| | B29L 31/08 | (2006.01) |
| | B29C 70/48 | (2006.01) |
| | B29K 307/04 | (2006.01) |

(52) U.S. Cl.
CPC ............ *F01D 5/3007* (2013.01); *B29C 70/48* (2013.01); *B29K 2307/04* (2013.01); *B29L 2031/08* (2013.01); *F05D 2220/36* (2013.01); *F05D 2230/53* (2013.01); *F05D 2240/30* (2013.01); *F05D 2300/6034* (2013.01); *Y02T 50/672* (2013.01); *Y02T 50/673* (2013.01)

(56) References Cited

U.S. PATENT DOCUMENTS

| | | | | |
|---|---|---|---|---|
| 4,343,593 | A * | 8/1982 | Harris | F01D 5/282 |
| | | | | 416/193 A |
| 4,802,824 | A * | 2/1989 | Gastebois | F01D 5/282 |
| | | | | 416/193 A |
| 5,049,035 | A * | 9/1991 | Marlin | F01D 5/22 |
| | | | | 416/193 A |
| 6,821,087 | B2 * | 11/2004 | Matsumoto | F01D 5/282 |
| | | | | 415/191 |
| 8,251,651 | B2 * | 8/2012 | Propheter-Hinckley | |
| | | | | F01D 5/284 |
| | | | | 415/200 |
| 9,022,733 | B2 * | 5/2015 | Coupe | C04B 35/524 |
| | | | | 415/209.4 |
| 9,033,673 | B2 * | 5/2015 | Roussille | F01D 5/147 |
| | | | | 416/229 A |
| 9,212,560 | B2 * | 12/2015 | McCaffrey | F01D 5/147 |
| 9,976,426 | B2 * | 5/2018 | Turner | F01D 5/225 |
| 2013/0004326 | A1 * | 1/2013 | McCaffrey | F01D 5/147 |
| | | | | 416/241 B |

* cited by examiner

BLADE EQUIPPED WITH PLATFORMS COMPRISING A RETAINING LEG

CROSS-REFERENCE TO RELATED APPLICATIONS

This application is the U.S. national phase entry under 35 U.S.C. § 371 of International Application No. PCT/FR2016/050982, filed on Apr. 26, 2016, which claims priority to French Patent Application No. 1553851, filed on Apr. 29, 2015, the entireties of which are herein incorporated by reference.

FIELD OF THE INVENTION

The present invention relates to a preform for a turbine engine blade and also to a single-piece blade that can be formed from such a preform, to a bladed wheel, and to a turbine engine including such a blade.

Such a preform may be used to make blades having aerodynamic platforms provided with retaining legs. Such blades may in particular be fan blades of an airplane turbojet, to mention just one example.

STATE OF THE PRIOR ART

In order to reduce the weight of airplane turbojets, and thus reduce the consumption of such turbojets, it is now known to fabricate some of the blades of the jet out of composite material, which is much lighter than the metal that was conventionally used in the past.

For this purpose, it is also known nowadays to use three-dimensional weaving techniques in order to obtain fiber preforms that give rise to composite blades of very good quality. Document WO 2014/076408 describes in particular a method of weaving a fiber preform that makes it possible to obtain in single-piece manner blades that are provided with pressure side and suction side platforms, those platforms being of constant thickness.

Nevertheless, those platforms need to satisfy a large number of requirements and to perform numerous functions. Mainly, such platforms need to perform an aerodynamic function of defining and channeling the air streams flowing through the turbojet. Nevertheless, they also need to provide mechanical strength that is guaranteed for all stages of flight and they must also provide coherent integration in the environment of the engine, in particular avoiding introducing downstream disturbances in the air stream. Thus, the shape of platforms needs to be finely controlled, throughout the operation of the engine, and regardless of the stage of flight.

Unfortunately, in particular during tests and simulations carried out on such blades, the inventors have found that various zones of those platforms derived from 3D weaving become deformed to a greater or lesser extent under the effect of centrifugal forces that act while the turbine engine is in operation. In particular, the inventors have observed that the deformation of a zone of a platform increases with increasing distance of that zone from the airfoil.

Under such circumstances, those platforms present shape irregularities in operation that can disturb the air stream and thus the efficiency of the turbine engine. In addition, the inventors have observed that, amongst other things, the bending depends on cantilever length. Thus, since the cantilever length differs between the pressure side and suction side platforms of two consecutive blades, there is a discontinuity of bending at that interface, leading to a risk of the platforms overlapping.

There thus exists a real need for a preform, a blade, a bladed wheel, and a turbine engine that avoid the drawbacks inherent to the above-mentioned known systems, at least to some extent.

SUMMARY OF THE INVENTION

The present description provides a preform for a turbine engine blade, the preform being obtained by three-dimensional weaving and comprising a first longitudinal segment suitable for forming at least a portion of a blade root, a second longitudinal segment extending the first longitudinal segment upwards, and suitable for forming at least a portion of a stilt portion, a third longitudinal segment extending the second longitudinal segment upwards, and suitable for forming an airfoil portion, a first transverse segment extending transversely from the junction between the second and third longitudinal segments, and suitable for forming a first platform, and a first oblique segment extending from the junction between the first and second longitudinal segments to the first transverse segment, and suitable for forming a retaining leg for the first platform.

By means of such a preform, it is possible to obtain in single-piece manner a blade that comprises a blade root, a stilt portion, an airfoil portion, and at least one platform having a retaining leg serving to retain the platform against centrifugal force while the turbine engine is in operation. This stiffens the platform and reduces the extent to which it deforms in operation.

Specifically, the centrifugal forces acting on the platform are taken up by the retaining leg and transmitted to the root or the stilt portion of the blade, which are structural portions of the blade. The platform and the retaining leg thus form a kind of box section that reduces the consequences of the cantilever of the platform. Under such circumstances, the platform conserves a relatively regular profile in operation, thus disturbing the flow of the air stream little or not at all.

Because of this preform, it is thus possible to benefit from the advantages of a 3D woven single-piece blade (weight saving; small number of parts; simplified assembly and maintenance; etc.) while ensuring aerodynamic regularity for the air stream.

In addition, this configuration also makes it possible to reduce the discontinuity that is usually observed in operation at the interface between adjacent platforms. Furthermore, the retaining leg also serves to reduce any risk of one platform overlapping onto a neighboring platform, e.g. in the event of ingesting a bird.

In the present description, the terms "longitudinal", "transverse", "bottom", "top", and their derivatives are defined relative to the main direction of the blade in question, the blade root being situated at the bottom end of the blade in this frame of reference; the terms "proximal", "distal", and their derivatives are defined relative to the airfoil of the blade; the terms "axial", "radial", "tangential", and their derivatives are defined relative to the main axis of the wheel having these blades, i.e. in general, the axis of the turbine engine. The term "axial plane" designates a plane containing the main axis of the turbine engine and the term "radial plane" designates a plane perpendicular to the main axis; the term "longitudinal plane" designates a plane parallel to the main direction of the blade and perpendicular to the direction in which the blade root extends: such a longitudinal plane is thus a radial plane in the reference frame of the turbine engine. In addition, the terms "upstream" and "downstream" are defined relative to the flow of air through the turbine engine.

Finally, the term "three-dimensional weaving" is used to designate a weaving technique in which weft yarns move within an array of warp yarns in such a manner as to form a three-dimensional mesh of yarns in a three-dimensional weave: all of the layers of yarns in such a fiber structure are thus woven during a single weaving step within a three-dimensional loom.

In certain embodiments, the first oblique segment is continuous from the upstream end to the downstream end of the preform. The platform is thus held over its entire length, thereby reducing its deformation more effectively.

In other embodiments, the first oblique segment comprises a plurality of tabs that are spaced apart from upstream to downstream. This configuration makes it possible to reduce the weight of the preform and thus the weight of the final blade. It also makes it easier to unmold the blade after the preform has been consolidated.

In certain embodiments, the distal end of the first oblique segment runs along the distal end of the first transverse segment. In this way, centrifugal forces are taken up at the platform where they are the greatest, i.e. where the platform is offset furthest from the airfoil portion.

In certain embodiments, the distal end of the first oblique segment is attached to the first transverse segment. This makes it easier to shape the preform for consolidation in order to achieve a final blade in which the platform and the retaining leg are secured to each other. Such fastening may be achieved by any fastener means, e.g. stitching, adhesive, riveting, or indeed fastening with pins.

In certain embodiments, the first oblique segment is substantially plane. This facilitates transmitting forces to the root or the stilt portion of the blade.

In certain embodiments, the first longitudinal segment possesses a length that is substantially constant from the upstream end to the downstream end of the preform. This facilitates making the non-interlinking that serves to separate second longitudinal segment and the first oblique segment.

In certain embodiments, the length of the second longitudinal segment increases going from the upstream end of the preform to its downstream end. This is particularly useful for a fan blade in order to ensure continuity of the air stream between the smaller-diameter upstream shell and the larger-diameter downstream drum.

In certain embodiments, the preform includes a second transverse segment extending transversely from the junction between the second and third longitudinal segments, level with and going away from the first transverse segment, being suitable for forming a second platform, and a second oblique segment extending from the junction between the first and second longitudinal segments to the second transverse segment, and suitable for forming a retaining leg for the second platform.

It can naturally be understood that all of the characteristics mentioned above concerning the first transverse segment and the first oblique segment can be transposed to the second transverse segment and to the second oblique segment.

In other embodiments, the fiber preform has only one transverse segment and only one oblique segment. Under such circumstances, the final blade possesses a single platform adapted to extend as far as the neighboring blade, thereby increasing the regularity of the air stream between two neighboring blades. Under such circumstances, the platform is preferably provided on the suction side: this facilitates shaping and then unmolding of the blade after the preform has been consolidated.

In certain embodiments, the preform includes an interface element provided at the junction between the second and third longitudinal segments on its surface remote from the first transverse segment. This interface element serves to co-operate with the coinciding platform of the neighboring blade. Depending on its configuration, it can thus protect the blade from this preform in the event of impact against the neighboring blade, e.g. in the event of ingesting a bird, and/or it can block the position of the platform of the neighboring blade against centrifugal forces. In certain embodiments, the interface element is a fitted metal strip. By way of example, this strip may be fastened to the preform prior to co-injection therewith.

In certain embodiments, the interface element is a woven strip extending from the junction between the second and third longitudinal segments.

In certain embodiments, the yarns used for weaving the preform are carbon fibers. Nevertheless, they could be any other type of yarn, for example glass fibers or Kevlar fibers.

In certain embodiments, the weave used for the three-dimensional weaving of the preform is of the 3D interlock type. Nevertheless, the outside surfaces of the preform may be essentially made by two-dimensional weaving, e.g. of the satin type.

The present description also provides a turbine engine blade comprising a blade root, a stilt portion extending upwards from the blade root, an airfoil portion extending upwards from the stilt portion, a platform extending transversely to the airfoil portion from the junction between the stilt portion and the airfoil portion, and a retaining leg extending between the root or the stilt portion at one end and the platform at the other end.

It can be understood that this blade corresponds to the blade that can be obtained from the above preform. Nevertheless, such a blade could equally well be obtained using some other method and could be made out of some other material: by way of example, such a blade should be made out of metal using an appropriate casting method. Either way, all of the characteristics and advantages described above can be transposed directly to this blade, regardless of the technique used for obtaining it.

In certain embodiments, the blade is made in single-piece manner out of composite material by means of a preform in accordance with any of the preceding embodiments, said preform being shaped in a mold and embedded in a matrix.

In certain embodiments, the matrix is of organic type. In particular it may be an epoxy resin.

The present description also relates to a bladed wheel for a turbine engine, and having a plurality of blades in accordance with any of the preceding embodiments.

It may be a rotor wheel, such as a fan, in which the blades are arranged angularly around a rotary hub, or it may be stator wheel, in which the blades are vanes arranged angularly within a stationary ring.

The present description also provides a turbine engine, including at least one blade or at least one bladed wheel in accordance with any preceding embodiment.

The above-mentioned characteristics and advantages, and others, appear on reading the following detailed description of embodiments of the preform, of the blade, of the bladed wheel, and of the turbine engine that are proposed. The detailed description is made with reference to the accompanying drawings.

BRIEF DESCRIPTION OF THE DRAWINGS

The accompanying drawings are diagrammatic and seek above all to illustrate the principles of the invention.

In the drawings, from one figure to another, elements (or portions of an element) that are identical are referenced using the same reference signs. Furthermore, elements (or portions of an element) belonging to different embodiments but having analogous functions are identified in the figures by numerical references increased by 100, 200, etc.

DETAILED DESCRIPTION OF EMBODIMENTS

In order to make the invention more concrete, embodiments are described in detail below with reference to the accompanying drawings. It should be understood that the invention is not limited to these embodiments.

Figure 1:
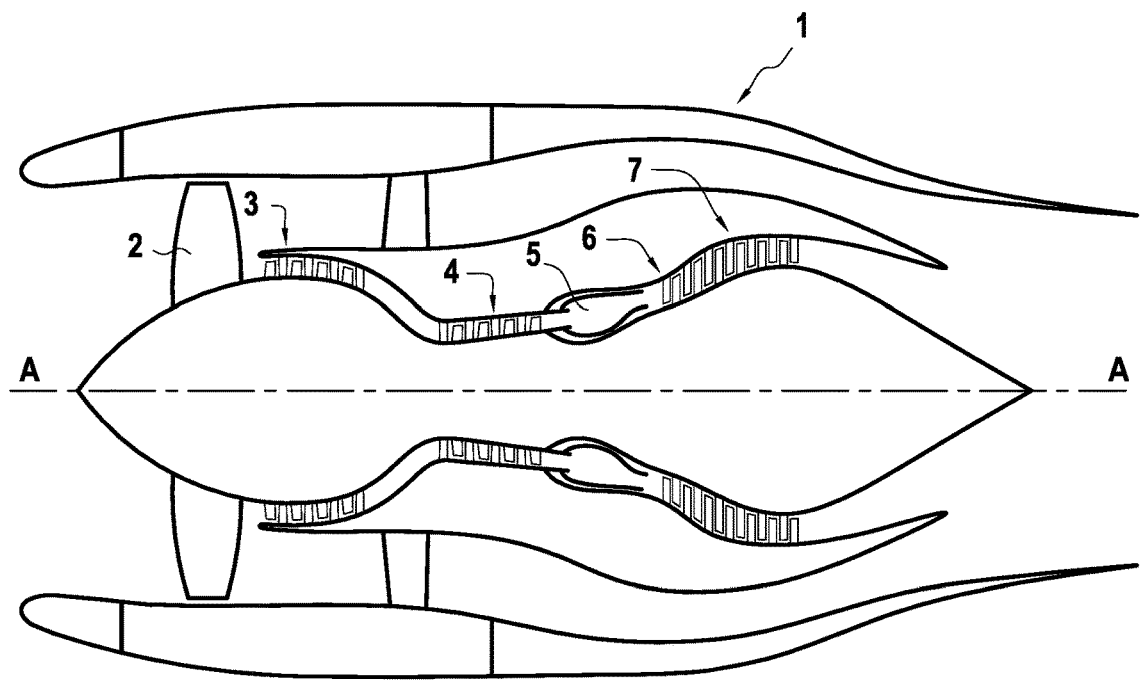
FIG. 1 is an axial section view of a turbine engine of the invention.

FIG. 1 is a section view of a bypass turbojet 1 of the invention, the section being on a vertical plane containing the main axis A of the jet. Going from upstream to downstream in the flow direction of the air stream, it comprises a fan 2, a low pressure compressor 3, a high pressure compressor 4, a combustion chamber 5, a high pressure turbine 6, and a low pressure turbine 7.

Figure 2:
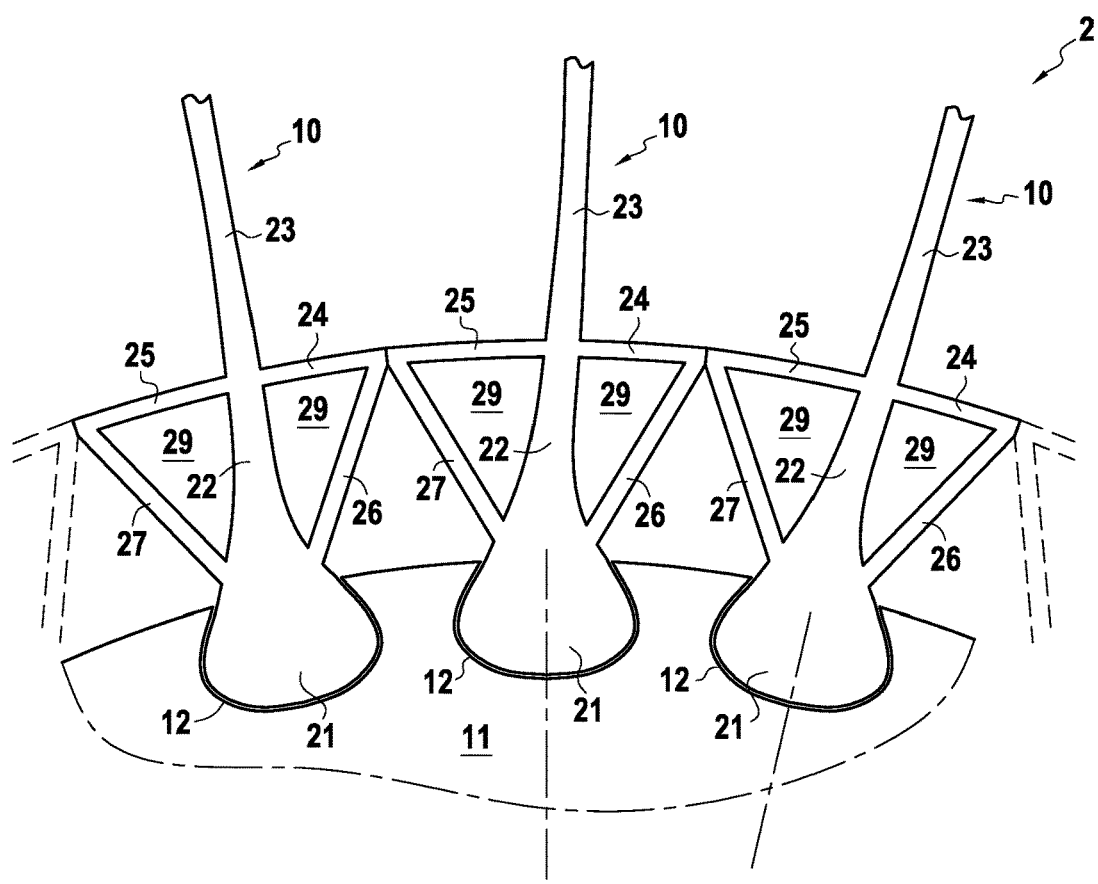
FIG. 2 is a fragmentary radial section diagram of a bladed wheel of the invention.

As shown in FIG. 2, the fan 2 has a plurality of fan blades 10 mounted angularly around the axis A on a disk 11 that is connected to the low pressure shaft of the turbine engine 1.

Figure 3:
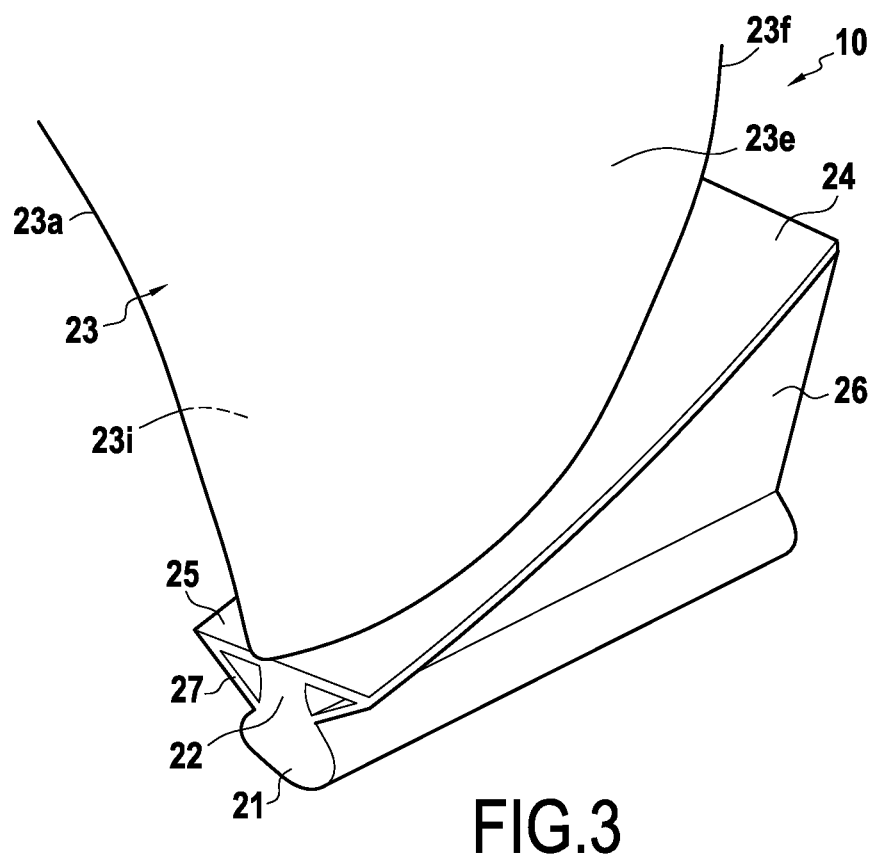
FIG. 3 is a fragmentary perspective view of a blade constituting an embodiment.
Figure 4:
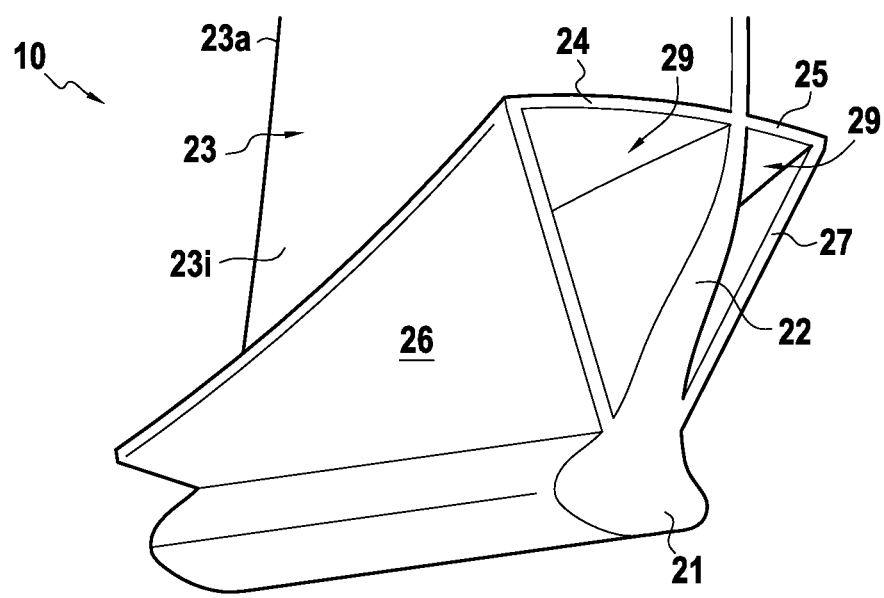
FIG. 4 is a fragmentary perspective view of the FIG. 3 blade seen from another angle.

Such a fan blade is shown in FIGS. 3 and 4. It comprises a blade root 21 of dovetail-shape configured to engage in a slot 12 of the disk 11 so as to secure it to the disk 11. The blade root 21 is extended upwards by a still portion 22 followed by an airfoil 23 presenting a suction side face 23e and a pressure side face 23i each going from upstream to downstream between a leading edge 233a and a trailing edge 23f.

The blade 10 also has a suction side platform 24 extending transversely from the suction side of the blade from the junction between the still portion 22 and the airfoil 23, and a pressure side platform 25 extending transversely from the pressure side of the blade from the junction between the stilt portion 22 and the airfoil 23.

The blade 10 also has a suction side retaining leg 26 extending from the junction between the blade root 21 and the stilt portion 22 to the distal end of the suction side platform 24, and in analogous manner a pressure side retaining leg 27 extending from the junction between the blade root 21 and the stilt portion 22 to the distal end of the suction side platform 25. Thus, on both sides of the blade 10, each platform 24, 25 co-operates with its retaining leg 26, 27 and with the stilt portion 22 to form a box section 29 possessing a substantially triangular profile.

As can be seen in FIGS. 3 and 4, the junction zone between the blade root 21 and the stilt portion 22 is located at a height that is substantially constant all along the blade 10 from upstream to downstream. In contrast, the height of the stilt portion 22 increases from upstream to downstream in such a manner that the box sections 29 are funnel-shaped, flaring towards the downstream end of the blade 10.

In this example, the blade 10 is obtained in single-piece manner by 3D weaving a fiber preform 30, by shaping the preform 30, and by injecting an organic resin by using the resin transfer molding (RTM) method known to the person skilled in the art.

Figure 5:
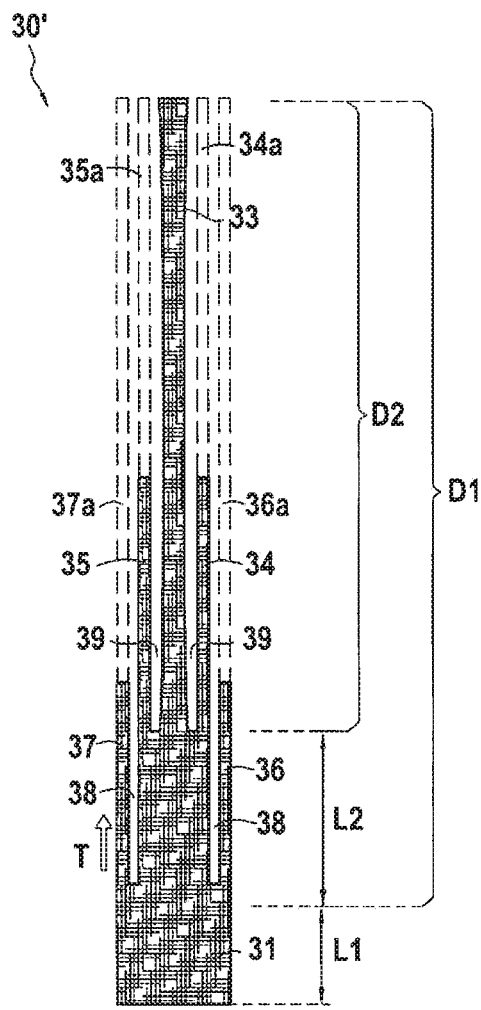
FIG. 5 is a diagrammatic view of the preform corresponding to this embodiment of the blade prior to being shaped.
Figure 6:
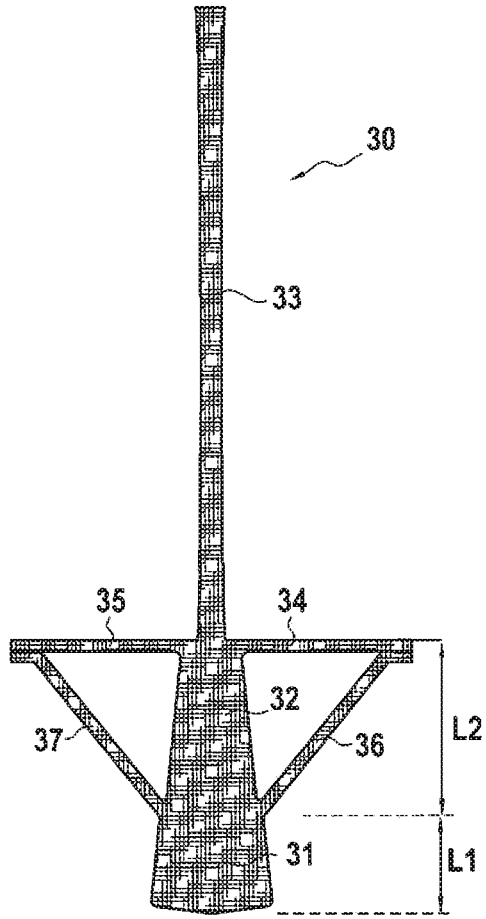
FIG. 6 is a diagram showing the preform corresponding to the blade after it has been shaped.

FIG. 5 shows the three-dimensionally woven blank 30' of the preform 30 that is suitable for making this embodiment of a blade 10. FIG. 6 shows the final preform 30 after the blank 30' has been cut and shaped. The preform blank 30' is described from bottom to top, i.e. from upstream to downstream in the weaving direction T. Nevertheless, it should naturally be understood that the weaving could be carried out from the other end and in the opposite direction.

In this embodiment, the preform 30 is three-dimensionally woven out of carbon fibers using a 3D interlock weave. Only the surfaces of the preform 30 are woven two-dimensionally with a satin type weave.

At the bottom end, the weaving begins by making a first longitudinal segment 31 that is to form the root 21 of the blade 10. The first longitudinal segment 31 has a length L1.

Above this first longitudinal segment 31, there begins a first zone of non-interlinking D1 in which a first free strip 36a, a second longitudinal segment 32, and a second free strip 37a are woven jointly in non-interlinked manner with non-interlinking planes 38. Weaving methods that enable such non-interlinking are now well known in the field of 3D weaving. These first and second free strips preferably possess a thickness of two or three layers of yarns, i.e. a thickness of about 2 millimeters (mm) or 3 mm. This first zone of non-interlinking may begin at some arbitrary height along the future stilt portion. The second longitudinal segment 32 has a length L2.

Above the second longitudinal segment 32, there begins a second zone of non-interlinking D2 in which the first free strip 36a, a third free strip 34a, a third longitudinal segment 33, a fourth free strip 35a, and the remainder of the second free strip 37a are woven jointly in non-interlinked manner, together with two new planes of non-interlinking 39 in addition to the first planes of non-interlinking 38, which continue.

Once weaving has terminated, the third and fourth free strips 34a and 35a are cut so as to form a first transverse segment 34 that is to form the suction side platform 24 of the blade 10, and a second transverse segment 35 that is to form the pressure side platform 25 of the blade 10.

The first and second free strips 36a and 37a are also cut so as to form a first oblique segment 36 that is to form the suction side retaining leg 26 of the blade 10, and a second oblique segment 37 that is to form the retaining leg 27 of the blade 10.

It should be observed at this point that the qualifications "oblique", "transverse", and "longitudinal", are used as a function of the final position of the segment under consideration of the preform, the transverse and oblique segments necessarily being woven longitudinally prior to being folded respectively transversely or obliquely.

The blank 30' may then be moistened to soften it and make it easier to move the fibers out of register. The blank 30' is then put into a forming mold having an inside space that matches the shape that is required for the preform 30.

The preform 30 is then dried so as to stiffen it, thereby locking the shape imposed during shaping. As shown in FIG. 6, the distal end of each oblique segments 36, 37 then extends along the distal end of the corresponding transverse segment 34, 35. The ends of these segments may be stitched together in order to secure them to each other.

The preform 30 as shaped in this way is finally placed in an injection mold having the dimensions of the desired final blade 10. Inserts are also inserted in the box sections formed by the transverse and oblique segments 34, 35, and 36, 37 so as to retain the shape of these box sections and prevent the matrix from filling in their inside volumes. The matrix is then injected, specifically with an epoxy resin. Such injection may for example be performed by the known RTM method. At the end of this consolidation, the inserts are removed from the box sections 29 so as to obtain the desired blade 10.

Naturally, the above-described weaving example is only one example among many other possible examples that the person skilled in the art recognizes easily. In particular, it is possible to imagine other arrangements of non-interlinking and to use other weaving techniques such as crossing layers, extracting layers, or transitions of thickness, in order to obtain an analogous preform shape. The person skilled in the art will find numerous weaving examples in Document WO 2014/076408, in particular.

Specifically, in a variant embodiment, the first and second free strips 36a and 37a are cut at certain locations at the junction zone between the first and second longitudinal segments. Under such circumstances, the resulting oblique segments 36, 37 are in fact made up of a plurality of tabs that are spaced apart from one another.

Figure 7A:
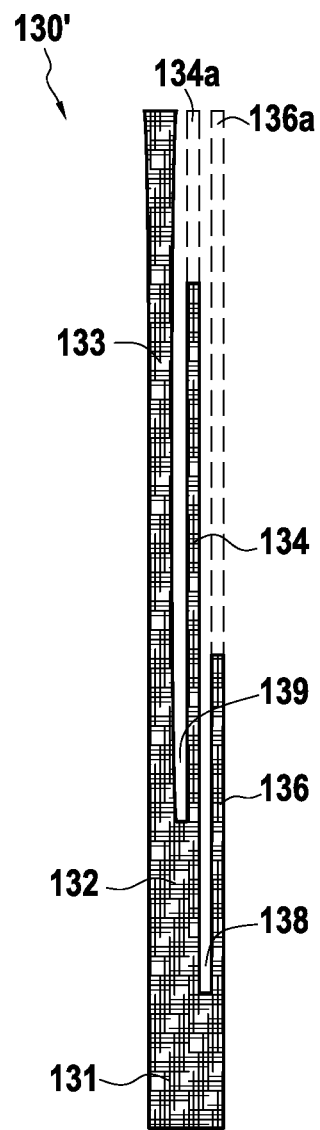
FIG. 7A is a diagram showing a second embodiment prior to being shaped.
Figure 7B:
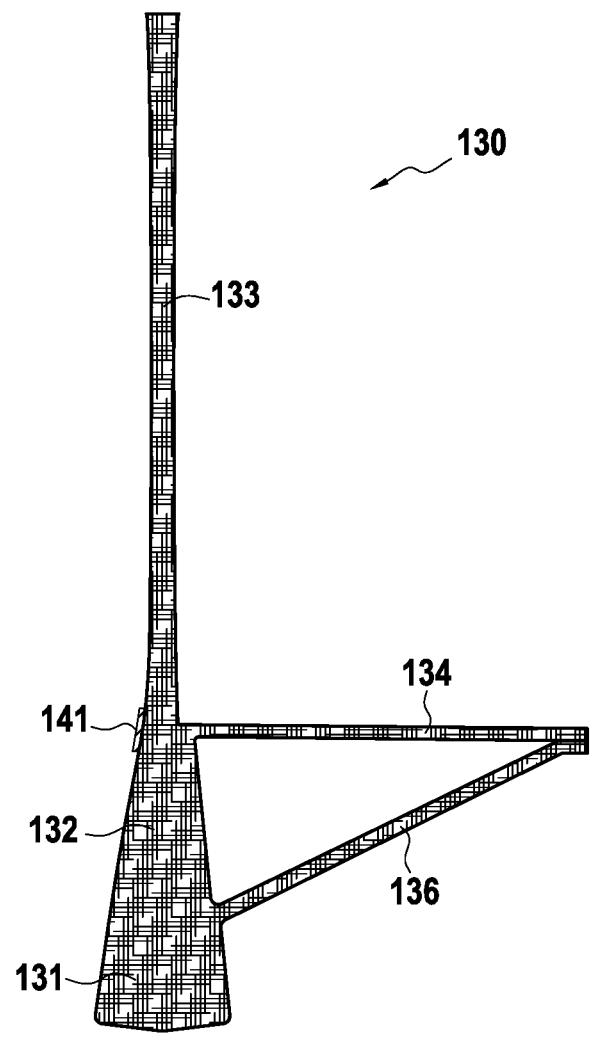
FIG. 7B is a diagram showing the platform of the second embodiment after it has been shaped.

FIGS. 7A and 7B show a second preform embodiment 130. In this second embodiment, the preform 130 has only one transverse segment 134 and only one oblique segment 136 provided on the suction side. The blade resulting from such a preform 130 thus possesses only one platform, which is provided on its suction side. This platform and its retaining leg are thus longer in order to occupy the entire space between two consecutive blades within the fan.

Thus, the method of weaving the blank 130' of this preform 130 is entirely analogous to the method of the first embodiment except that only the first and third free strips 136a and 134a are woven in order to deliver the longitudinal segments 132 and 133 and the blank 130'. In addition, these free strips 134a and 136a are cut at a greater height in order to provide the transverse and oblique segments 134 and 136 of greater length.

In this second embodiment, a metal strip 141 is fitted all along the preform 130 at the junction between the second and third longitudinal segments 132 and 133 on the side that is opposite from the transverse segment 134. While the matrix is being injected, this metal strip 141 is held captive on the surface of the blade and thus forms an interface element suitable for co-operating with the distal end of the platform of a neighboring blade.

The embodiments or implementations described in the present description are given as non-limiting illustrations, and a person skilled in the art can easily, in the light of the description, modify these embodiments or implementations, or can envisage others, while remaining within the ambit of the invention.

Furthermore, the various characteristics of these embodiments or implementations can be used singly or combined with one another. When they are combined, the characteristics may be combined as described above or in other ways, the invention not being limited to the specific combinations described in the present description. In particular, unless specified to the contrary, a characteristic described with reference to any one embodiment or implementation may be applied in analogous manner to another embodiment or implementation.

The invention claimed is:

1. A preform for a turbine engine blade, comprising:
   a first longitudinal segment configured to form at least a portion of a blade root;
   a second longitudinal segment extending the first longitudinal segment upwards, and configured to form at least a portion of a stilt portion;
   a third longitudinal segment extending the second longitudinal segment upwards, and configured to form an airfoil portion;
   a first transverse segment extending transversely from a junction between the second and third longitudinal segments, and configured to form a first platform; and
   a first oblique segment, extending from a junction between the first and second longitudinal segments to the first transverse segment, and configured to form a retaining leg for the first platform, a gap being provided between the first oblique segment and the second longitudinal segment,
   wherein the preform is obtained in a single-piece manner by three-dimensional weaving.

2. The preform according to claim 1, wherein a distal end of the first oblique segment runs along a distal end of the first transverse segment.

3. The preform according to claim 1, wherein a distal end of the first oblique segment is attached to the first transverse segment.

4. The preform according to claim 1, wherein the first longitudinal segment includes a length that is constant from an upstream end to a downstream end of the preform; and
   wherein the length of the second longitudinal segment increases going from the upstream end of the preform to its downstream end.

5. The preform according to claim 1, further comprising:
   a second transverse segment extending transversely from the junction between the second and third longitudinal segments, level with and going away from the first transverse segment, being configured to form a second platform; and
   a second oblique segment extending from the junction between the first and second longitudinal segments to the second transverse segment, and intended to form a retaining leg for the second platform.

6. The preform according to claim 1, further comprising an interface provided at the junction between the second and third longitudinal segments on its surface opposite from the first transverse segment.

7. The preform according to claim 6, wherein the interface is a fitted metal strip.

8. A turbine engine blade comprising:
   a blade root;
   a stilt portion extending upwards from the blade root;
   an airfoil portion extending upwards from a stilt portion;
   a platform extending transversely to the airfoil portion from a junction between the stilt portion and the airfoil portion; and
   a retaining leg extending between the root or the stilt portion at one end and the platform at the other end,
   wherein the turbine engine blade is made in single-piece manner out of composite material by means of the preform according to claim 1, said preform being shaped in a mold and embedded in a matrix.

9. The turbine engine blade according to claim 8, wherein the matrix is organic.

10. A bladed wheel for a turbine engine comprising a plurality of blades according to claim 8.

11. A turbine engine comprising at least one compressor, at least one combustion chamber, at least one turbine, and at least one blade according to claim 8.

* * * * *